(12) United States Patent
McClure (10) Patent No.: US 11,026,371 B2
(45) Date of Patent: Jun. 8, 2021

(54) AGRICULTURAL BALER WITH BALE FORMATION CONTROL BASED ON POWER REQUIREMENTS AND USAGE

(71) Applicant: CNH Industrial America LLC, New Holland, PA (US)

(72) Inventor: John R. McClure, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 134 days.

(21) Appl. No.: 16/380,346

(22) Filed: Apr. 10, 2019

(65) Prior Publication Data

US 2020/0323147 A1    Oct. 15, 2020

(51) Int. Cl.
*A01F 15/08* (2006.01)
*A01F 15/07* (2006.01)

(52) U.S. Cl.
CPC .......... *A01F 15/0833* (2013.01); *A01F 15/07* (2013.01); *A01F 2015/077* (2013.01); *A01F 2015/0795* (2013.01)

(58) Field of Classification Search
CPC .. A01F 15/07; A01F 15/0705; A01F 15/0825; A01F 15/0833; A01F 15/0841; A01F 15/085; A01F 2015/077; A01F 2015/078; A01F 2015/0795
USPC .......................................................... 100/88
See application file for complete search history.

(56) References Cited

U.S. PATENT DOCUMENTS

| 4,611,535 | A | * | 9/1986 | Anstey et al. | .......... | A01F 15/07 100/43 |
| 5,622,104 | A | | 4/1997 | Viesselmann et al. | | |
| 6,530,311 | B1 | * | 3/2003 | Wilkens et al. | ........ | A01F 15/07 100/40 |
| 7,481,158 | B2 | | 1/2009 | Gerngross et al. | | |
| 8,281,713 | B2 | | 10/2012 | Viaud | | |
| 10,034,432 | B2 | | 7/2018 | Hoffmann | | |

(Continued)

FOREIGN PATENT DOCUMENTS

EP         0268003 A2 *  5/1988   ............. A01F 15/00

OTHER PUBLICATIONS

Extended European Search Report for EP Application No. 20167793.7 dated Jul. 8, 2020 (five pages).

*Primary Examiner* — Adam J Eiseman
*Assistant Examiner* — Matthew Stephens
(74) *Attorney, Agent, or Firm* — Patrick Sheldrake; Peter Zacharias (57) ABSTRACT

An agricultural baler includes: a chassis; a coupler configured for connecting to a power source; a bale forming chamber including an apron assembly; an apron tensioning system that controls a baling pressure exerted on a bale forming in the bale forming chamber; a bale release that releases a fully formed bale; and a controller operatively coupled to the apron tensioning system and the bale release. The controller is configured to: set a release size of the fully formed bale; receive a PTO power consumption signal or an available power signal from a tractor controller; determine a maximum available power based on the received signal; compare the maximum available power to a threshold power; and output a control signal to the apron tensioning system to decrease the baling pressure without changing the release size when the maximum available power is at a predetermined power value, relative to the threshold power.

17 Claims, 5 Drawing Sheets

(56) References Cited

U.S. PATENT DOCUMENTS

| | | | |
|---|---|---|---|
| 10,064,339 B2 | 9/2018 | Shrag et al. | |
| 10,827,685 B2 * | 11/2020 | Talsma | A01F 15/0715 100/88 |
| 2013/0298787 A1 | 11/2013 | Simmons et al. | |
| 2016/0165803 A1 * | 6/2016 | Smith | A01F 15/0833 100/88 |
| 2016/0235007 A1 * | 8/2016 | Hoffmann | A01F 15/085 100/88 |
| 2018/0084723 A1 * | 5/2018 | Gresch et al. | A01D 31/1274 56/10.2 |
| 2018/0125010 A1 * | 5/2018 | Gresch et al. | A01F 15/08 100/88 |
| 2021/0022296 A1 * | 1/2021 | Miwa | A01D 69/03 100/88 |

* cited by examiner

AGRICULTURAL BALER WITH BALE FORMATION CONTROL BASED ON POWER REQUIREMENTS AND USAGE

FIELD OF THE INVENTION

The present invention pertains to agricultural vehicles and, more specifically, to agricultural balers.

BACKGROUND OF THE INVENTION

Round balers have become quite prevalent for their capability of producing a conveniently sized cylindrical bale, very often automatically wrapped with a sheeting material such as net or film. Crop material, such as hay, is picked up from the ground as the baler travels across the field, and is fed into an expandable chamber where it is rolled up to form a compact cylindrical hay package.

Known round balers generally have an expandable bale chamber defined by a pair of fixed sidewalls, and a plurality of side-by-side belts cooperating with a series of transverse rolls, mounted between a pair of pivotally mounted arms commonly known as a sledge. The chamber includes an inlet opening in the front through which crop material is fed. Also included is a pair of take up arms pivotally mounted on the main frame, between which arms multiple of guide rolls are journalled. A biasing force is applied on the take up arms to urge the outer surfaces of the guide rolls against the belts to maintain belt tension and prevent slack from occurring in the belts during expansion and contraction of the chamber.

It is known to provide a round baler density system to apply increased tension on the belts in order to create a densely packed bale. A hydraulic density cylinder with a controlled fluid release limits the rate of bale chamber expansion and provides a degree of crop compaction during baling. The amount of compaction may be varied by adjusting the fluid release rate, often in the form of a pressure relief valve which restricts the extension of the density cylinder by forcing fluid through a variable relief. When the bale reaches a desired size and is discharged, mechanical springs acting on the take up arms are typically employed to return the hydraulic cylinder to its initial position and provide a biasing force on the take up arms so a new bale forming cycle may commence.

While known round balers are effective to form round bales, in certain operating situations the released bales may have different sizes due to releasing early. This is inconvenient for a farmer, who may have to store differently sized bales or try to sell bales that are not the proper size.

What is needed in the art is a round baler that can form bales having a consistent size.

SUMMARY OF THE INVENTION

Exemplary embodiments disclosed herein provide an agricultural baler that can adjust a baling pressure exerted on a forming bale when the maximum power available to the baler is at a predetermined value relative to a threshold.

In some exemplary embodiments provided in accordance with the present disclosure, an agricultural baler includes: a chassis; a coupler carried by the chassis and configured for connecting to a power source; a bale forming chamber carried by the chassis and including an apron assembly having at least one chain and a drive roll coupled to the at least one chain and the coupler; an apron tensioning system coupled to the at least one chain and configured to control a baling pressure exerted on a bale forming in the bale forming chamber; a bale release coupled to the bale forming chamber and configured to release a fully formed bale from the bale forming chamber; and a controller operatively coupled to the apron tensioning system and the bale release. The controller is configured to: set a release size of the fully formed bale defining when the fully formed bale is released; receive a PTO power consumption signal or an available power signal from a tractor controller; determine a maximum available power from the received signal; compare the maximum available power to a threshold power; and output a control signal to the apron tensioning system to decrease the baling pressure without changing the release size when the maximum available power at a predetermined power value, relative to the threshold power.

In some exemplary embodiments provided in accordance with the present disclosure, an agricultural baling system includes: a tractor having a frame, an engine carried by the frame, and a tractor controller; and a baler coupled to the tractor. The baler includes: a chassis; a coupler carried by the chassis and coupled to the engine; a bale forming chamber carried by the chassis and including an apron assembly having at least one chain and a drive roll coupled to the at least one chain and the coupler; an apron tensioning system coupled to the at least one chain and configured to control a baling pressure exerted on a bale forming in the bale forming chamber; a bale release coupled to the bale forming chamber and configured to release a fully formed bale from the bale forming chamber; and a controller operatively coupled to the apron tensioning system, the bale release, and the tractor controller. The controller is configured to: set a release size of the fully formed bale defining when the fully formed bale is released; receive a PTO power consumption signal or an available power signal from the tractor controller; determine a maximum available power from the received signal; compare the maximum available power to a threshold power; and output a control signal to the apron tensioning system to decrease the baling pressure without changing the release size when the maximum available power is at a predetermined power value, relative to the threshold power.

In some exemplary embodiments, a method of controlling formation of a second bale in a bale forming chamber to produce a fully formed second bale is provided. The method is performed by a controller and includes: outputting a first release signal to a bale release to release a first bale defining a first bale size from the bale forming chamber; determining a maximum available power that is available to form the second bale; comparing the maximum available power to a threshold power; decreasing a baling pressure exerted on the second bale by an apron assembly when the maximum available power is at a predetermined power value, relative to the threshold power; and outputting a second release signal to the bale release to release the fully formed second bale from the bale forming chamber, wherein the fully formed second bale defines a second bale size that is substantially equal to the first bale size.

In some exemplary embodiments, an agricultural baler includes: a chassis; a coupler carried by the chassis and configured for connecting to a power source; a bale forming chamber carried by the chassis and comprising an apron assembly comprising at least one chain and a drive roll coupled to the at least one chain and the coupler; a bale release coupled to the bale forming chamber and configured to release a fully formed bale from the bale forming chamber; a bale mass sensor associated with the bale forming chamber and configured to output a bale mass signal corresponding to a mass of a bale forming in the bale forming chamber; and a controller operatively coupled to the bale mass sensor and the bale release. The controller is configured to: set a release mass of the fully formed bale defining when the fully formed bale is released; receive the bale mass signal; determine the mass of the bale forming in the bale forming chamber based on the received bale mass signal; compare the mass of the bale forming in the bale forming chamber to the set release mass; and output a release signal to the bale release when the mass of the bale forming in the bale forming chamber is at least equal to the set release mass so the bale release releases the bale.

One possible advantage that may be realized by exemplary embodiments disclosed herein is that the baling pressure exerted on the forming bale can be reduced when the tractor requires more power to operate, reducing the risk of the tractor stalling and/or baling being interrupted.

Another possible advantage that may be realized by exemplary embodiments disclosed herein is that the fully formed bales can be similar in size, which may be a diameter and/or a mass of the bale, to avoid issues associated with forming unevenly sized bales.

Yet another possible advantage that may be realized by exemplary embodiments disclosed herein is that the controller can be configured so the apron assembly is exerting a maximum baling pressure on the forming bale based on the maximum power that is available, which may result in bales with uniform mass rather than uniform diameter.

Yet another possible advantage that may be realized by exemplary embodiments disclosed herein is that an operator can set the release mass of the bale so the formed bales have the proper mass for sale if the operator is advertising the bales by mass rather than diameter.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

Figure 1:
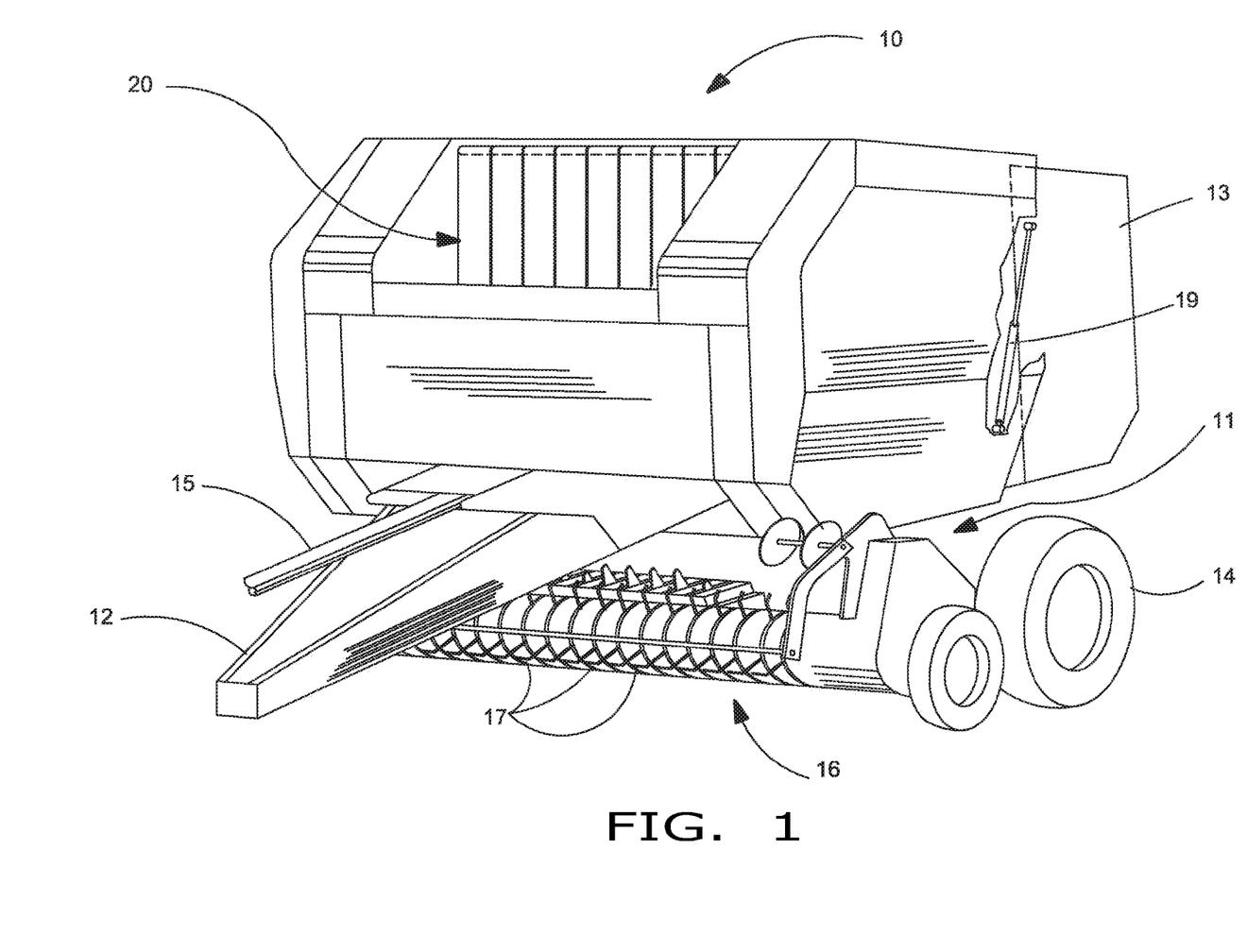
FIG. 1 illustrates a perspective view of an exemplary embodiment of an agricultural baler provided in accordance with an exemplary embodiment of the present disclosure.
Figure 2:
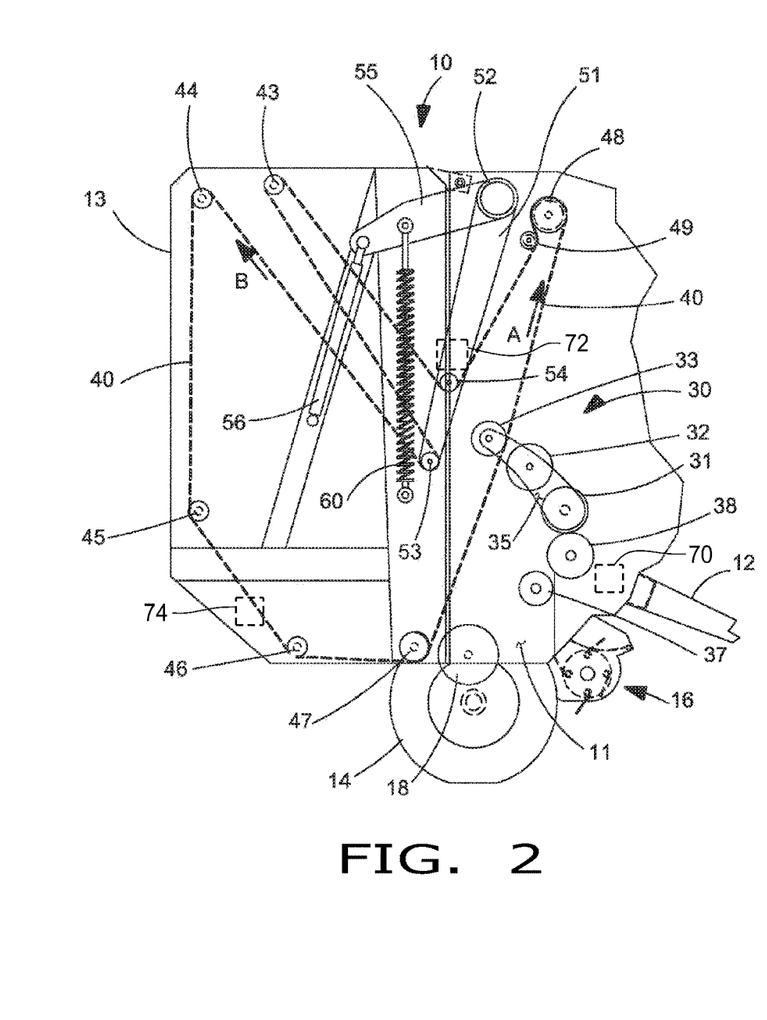
FIG. 2 illustrates a side section view of a bale forming chamber of the baler of FIG. 1 at the beginning of a bale forming cycle, in accordance with an exemplary embodiment of the present disclosure.
Figure 3:
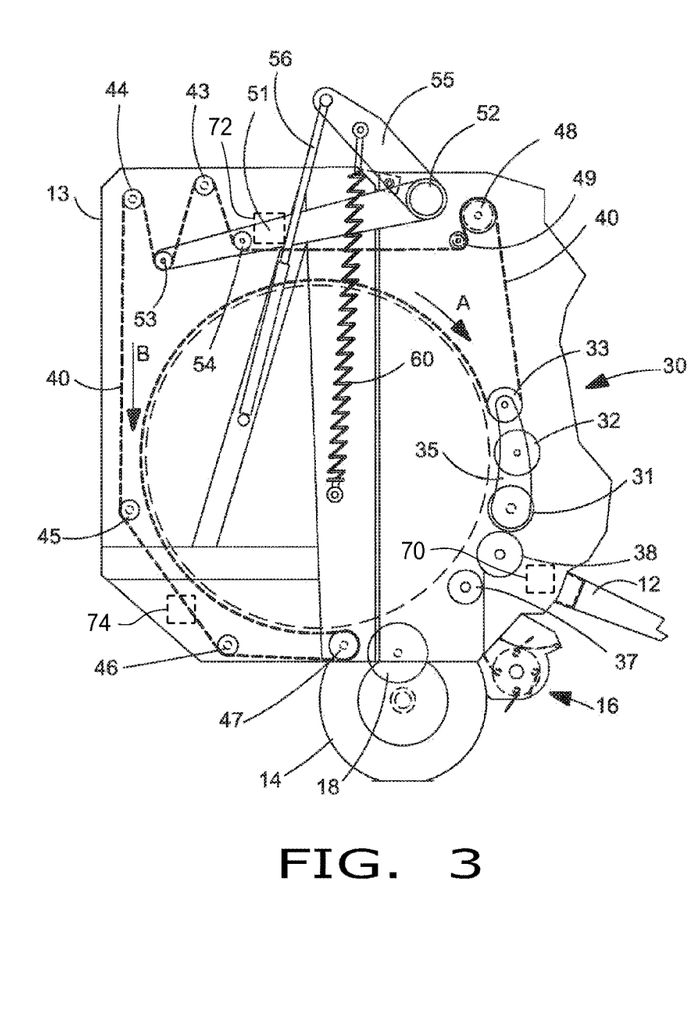
FIG. 3 illustrates the bale forming chamber of FIG. 2 near the end of the bale forming cycle.

Referring now to the drawings, and more particularly to FIGS. 1-3, an exemplary embodiment of an agricultural baler 10 is illustrated that includes a chassis 11 supported by a pair of wheels 14. A tongue 12 is provided for connection to a tractor 410 (illustrated in FIG. 4). Pivotally connected to the sides of the chassis 11 is a tailgate 13 that may be closed (as shown in FIG. 1) during bale formation or pivoted open by a tailgate actuator 19, which may also be referred to as a "bale release," to release a fully formed bale. A pickup 16, mounted on the chassis 11, includes a plurality of tines 17 movable in a predetermined path to lift crop material from the ground and deliver it rearwardly toward a rotatably mounted floor roll 18.

A bale forming chamber 20 for forming bales is defined partly by a sledge assembly 30 including a plurality of rollers 31, 32 extending transversely in the arcuate arrangement shown in FIGS. 2 and 3. Rollers 31, 32 are journalled at their ends in a pair of spaced apart arms 35, one of which is shown. These arms are pivotally mounted inside the chassis 11 on stub shafts for providing movement of sledge assembly 30 between the bale starting position shown in FIG. 2 and the full bale position shown in FIG. 3. Rollers 31, 32 are driven in a counter-clockwise direction by, e.g., chains and sprockets or gears, connected to and powered by a power source, such as an engine, via a drive shaft 15. A freely rotatable idler roller 33 is also carried by arms 35. Additionally, a starter roll 37, and a fixed roll 38 are located adjacent to roller 31, and are also driven in a counter-clockwise direction.

The bale forming chamber is further defined by an apron assembly 40 including a plurality of continuous side-by-side chains, which also may be referred to as belts, supported by guide rolls 43, 44, 45, 46, 47 rotatably mounted in tailgate 13 and a drive roll 48, mounted on chassis 11. Apron assembly 40 passes between roller 32 on sledge assembly 30 and idler roller 33, and is in engagement only with idler roller 33 and not roller 32 which is located in close proximity to the apron chains to strip crop material from the chains, in addition to its bale forming function. Drive roll 48 is powered via coupling to a coupler 70, which may be a power take-off (PTO) coupled to the tractor 410, and a drive train which moves apron assembly 40 along its changing path, indicated generally by arrows A and B in FIGS. 2 and 3. Many different types of couplings between the drive roll 48 and the coupler 70 are known, so further description is omitted for brevity. An additional guide roll 49 ensures proper driving engagement between apron assembly 40 and drive roll 48.

A pair of take up arms 51 (only one shown) are mounted to pivot conjointly with a cross shaft 52 between inner and outer positions, shown in FIGS. 2 and 3, respectively, and carry additional guide rolls 53, 54 for supporting apron assembly 40. Chain tension lever arm 55 is also affixed to shaft 52 to pivot with take up arms 51. A return spring 60 is secured between the chassis 11 and tension lever arm 55 to bias the shaft 52 and take up arms 51 toward the bale starting position (shown in FIG. 2) and move the take up arms toward the bale starting position following release of a completed bale. An apron tensioning system, which may include a hydraulic bale tension cylinder 56, is mounted between tailgate 13 and take up arms 51 and configured to resist movement of the take up arms 51 from the bale starting position (FIG. 2) toward the full bale position (FIG. 3).

Figure 4:
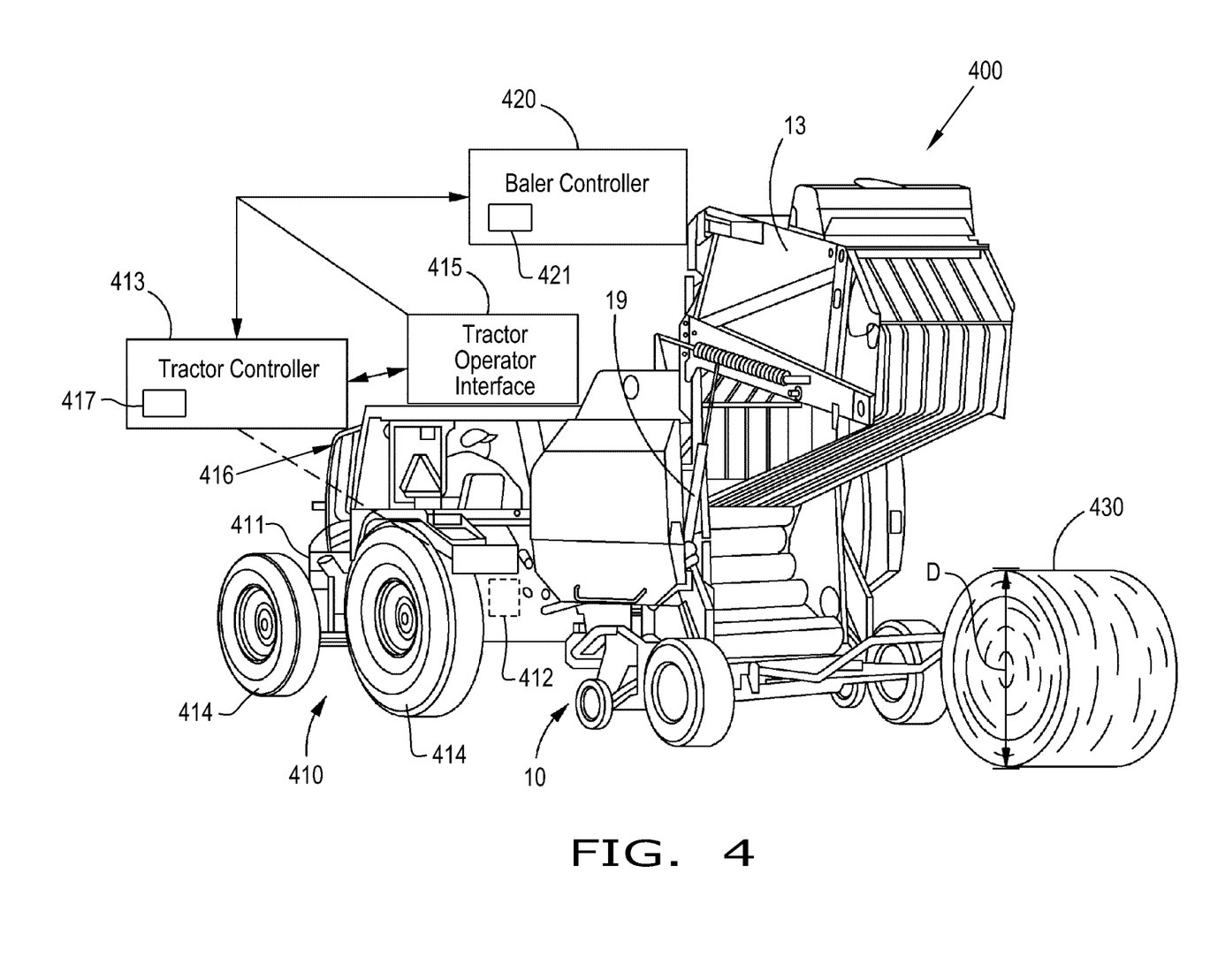
FIG. 4 illustrates a perspective view of an exemplary embodiment of an agricultural baling system including a tractor and the baler of FIGS. 1-3 coupled to the tractor, provided in accordance with an exemplary embodiment of the present disclosure.

Referring now to FIG. 4, an exemplary embodiment of an agricultural baling system 400 including the tractor 410 and the baler 10 coupled to the tractor 410 is illustrated. The tractor 410 includes a tractor frame 411 that carries an engine 412 and a tractor controller 413. The engine 412 is coupled to one or more wheels 414 carried by the frame 411 to deliver power to the wheels 414 and propel the tractor 410 forward, as is known. As previously described, the baler 10 may be coupled to the tractor 410 via the tongue 12, the drive shaft 15, and the coupler (power take-off) 70. The tractor 410 may also include an operator interface 415 placed in an operator cabin 416 that allows an operator to control various functions of the tractor 410 and/or the baler 10 via the tractor controller 413, which is operatively coupled the operator interface 415.

The baler 10 includes a baler controller 420 that is operatively coupled to the apron tensioning system, such as to the hydraulic bale tension cylinder 56, the tractor controller 413, and the bale release 19. The baler controller 420 may be operatively coupled to the tractor controller 413 by, for example, a controller area network (CAN) bus or other type of connection so the two controllers 413, 420 may exchange signals and control functions of the tractor 410 and the baler 10, respectively. The controllers 413, 420 may each include a respective memory 417, 421 that stores instructions for operating various functions of the tractor 410 and the baler 10, as will be described further herein.

The baler controller 420 is configured to set a release size of a fully formed bale 430 that defines when the fully formed bale is released. In some embodiments, the release size is a diameter D of the fully formed bale 430. Alternatively, or additionally, the release size may be a mass of the fully formed bale 430. The baler controller 420 may set the release size based on operator commands that are output to the baler controller 420 as signals from the operator interface 415, either directly or via the tractor controller 413. Once the fully formed bale 430 in the bale forming chamber 20 reaches the release size, the baler controller 420 can output a signal to the bale release 19 to open the tailgate 13 and release the fully formed bale 430 from the bale forming chamber 20. The baler 10 can then begin the cycle of forming a new bale. In some embodiments, the functions of the two controllers 413, 420 are combined in a single controller, or a single controller system, that controls operations of both the baler 10 and the tractor 410.

As is known, the apron assembly 40 exerts a baling pressure on a forming bale in the bale forming chamber 20 via the bale tension cylinder 56. The diameter of the forming bale may be monitored by operatively coupling the baler controller 420 to a bale diameter sensor, such as a potentiometer 72 (illustrated in FIGS. 2-3) associated with one or more of the take up arms 51, as is known. As the forming bale increases in size, it takes a greater force to exert the same baling pressure on the forming bale due to the increase in area that occurs as the forming bale grows. The increase in size of the forming bale also increases the power requirements to rotate the bale and pack the forming bale at a consistent density. Thus, a greater amount of power is required to form the bale at the same baling pressure, which corresponds to a bale density of the fully formed bale, as the size of the forming bale increases.

Generally, the power for forming the bales comes from a power source, such as the engine, of the tractor to the baler via the PTO. As the forming bale increases in diameter, the mass of the baler also increases. The additional mass of the baler increases the amount of power required by the tractor to pull the baler forward. If the controller is set to release the forming bale once it has reached a certain diameter, based on signals from the potentiometer, the controller signals for release of the bale when that diameter is reached. In some cases, the maximum power output of the engine is not high enough to propel the tractor and baler forward and also power the baler to form a bale at the set baling pressure.

Additionally, other components of the baling system, such as the density system squeezing the bale to form a dense bale, may draw power from the engine and reduce the amount of power available for the baler to utilize. This can lead to, for example, the tractor stalling, which interrupts the baling operation because no additional crop material is picked up and added to the forming bale, as well as the release of improperly sized bales.

To address some of these issues, the baler controller 420 is configured to receive a PTO power consumption signal or an available power signal from the tractor controller 413, determine a maximum available power based on the received signal, compare the maximum available power to a threshold power, and output a control signal to the apron tensioning system to decrease the baling pressure without changing the release size when the maximum available power is at a predetermined power value, relative to the threshold power. In some embodiments, the controller is configured to output the control signal when the maximum available power is equal to or less than the threshold power, i.e., the predetermined power value is equal to or less than the threshold power. However, it should be appreciated that the controller can also be configured to output the control signal when the maximum available power approaches the threshold power, i.e., the predetermined power value is greater than the threshold power. By decreasing the amount of baling pressure applied to the forming bale, the power requirement is reduced without interrupting formation of the bale so a bale with the set size is produced; however, the forming bale will have a lower density when the applied baling pressure is reduced.

The baler controller 420 may be configured to determine the maximum available power by, for example, receiving a PTO power consumption signal, determining a PTO power consumption from the received PTO power consumption signal, and subtracting the PTO power consumption from a maximum tractor power value, which may correspond to a maximum output of the engine 412, to determine the maximum available power. Alternatively, the tractor controller 413 may be configured to separately determine the available power based on a power consumption of the tractor 410. The tractor controller 413 can be configured to determine the available power based on input from one or more sensors, as is known, and then output the available power signal to the baler controller 420. In some embodiments, the maximum available power can be equal to the maximum power output of the engine 412 minus peripheral power usage, e.g., power used by ground pulling, electricity generation, HVAC, etc. If torque of the PTO 70 is monitored, then PTO power consumption, and thus the power consumption of the baler 10, can be determined by the tractor controller 413 to determine the maximum available power. Regardless of which way is used, the baler controller 420 can determine the maximum available power that the baler 10 can utilize to form the bale in the bale forming chamber 20 without exceeding the output of the engine 412.

After the maximum available power is determined, the baler controller 420, which may be integrated with the tractor controller 413, can compare the maximum available power to a threshold power. The threshold power may be, for example, a power that is needed by the apron assembly 40 to maintain a density of the bale forming in the bale forming chamber 20. As previously described, the power requirement to maintain the density of the bale generally increases as the forming bale increases in size, and the baler controller 420 can be configured to adjust the threshold power, as well as the predetermined power value, at different points in the bale formation. When the maximum available power is, for example, below the threshold power, indicating that insufficient power is available to maintain operation of the baler 10 at the current settings, the baler controller 420 can output the control signal to the apron tensioning system to decrease the baling pressure exerted on the forming bale, which decreases the density of the forming bale, without changing the release size. The baler controller 420 can, alternatively, output the control signal as the maximum available power approaches the threshold power to proactively prevent, for example, engine stalling. This will tend to allow release of a less dense, fully formed bale from the baler 10, but the fully formed bale that is released will have the same diameter and/or mass as a previous and/or subsequent fully formed bale.

In some embodiments, the baler controller 420 is configured to output another control signal to the apron tensioning system to increase the baling pressure when the maximum available power is greater than the threshold power. This may occur, for example, after the tractor 410 traverses a slope, which increases the power requirements of the tractor 410 and decreases the maximum available power, and additional power becomes available for the baler 10 to utilize. In some embodiments, the baler controller 420 is configured to determine a maximum baling pressure that can be exerted by the apron assembly 40 on the bale forming in the bale forming chamber 20, based on the maximum available power, and output a maximum pressure signal to the apron tensioning system so the maximum baling pressure is exerted on the forming bale. In this respect, the baler controller 420 can be configured to maximize the pressure exerted on the forming bale, and thus the bale density, without overloading the engine 412 of the tractor 410.

The baler controller 420 may determine if the maximum available power is at least equal to a set power requirement for the apron assembly 40 to exert a set baling pressure on the bale forming in the bale forming chamber, corresponding to a set density of the fully formed bale, and output a signal to the apron tensioning system so the set baling pressure on the bale forming in the bale forming chamber 20 if the maximum available power is at least equal to the set power requirement. Thus, in some embodiments, the baler controller 420 is configured to maintain a set density of the forming bale, except where necessary to avoid overloading the engine 412 of the tractor 410.

In some embodiments, the baler 10 further includes a bale mass sensor 74, such as a strain gauge (illustrated in FIGS. 2-3), that is associated with the bale forming chamber 20 and operatively coupled to the baler controller 420. The bale mass sensor 74 can be configured to output a bale mass signal that corresponds to a mass of the bale forming in the bale forming chamber 20, which is received by the baler controller 420. The baler controller 420 can be configured to set the release size as a mass of the fully formed bale. In some embodiments, the baler controller 420 can set the release size as a release mass based on signals from the operator interface 415, with the operator inputting the desired mass at which the formed bale should be released. The baler controller 420 can be further configured to determine a mass of the bale forming in the bale forming chamber 20 based on the received bale mass signal, compare the mass of the forming bale to the set release mass, and output a release signal to the bale release 19 when the mass of the forming bale is equal to the set release mass so the bale release 19 releases the bale. In this respect, the previously described set release size is not limited to a diameter of the forming bale, but can also be a mass of the forming bale.

From the foregoing, it should be appreciated that the baler controller 420 can maintain the size of the fully formed bales that are released while reducing the risk of stalling the tractor 410 when insufficient power is available to both propel the tractor 410 forwardly and maintain the baling density of the bale forming in the bale forming chamber 20 and/or the available power is decreasing to an insufficient level. Maintaining the diameter of the fully formed bales makes it easier to store bales, which are often wrapped together, and reduce the risk of moisture accumulation and associated rot due to space between one or more of the wrapped bales and the wrapping material. Maintaining the mass of the fully formed bales, on the other hand, reduces the risk of an operator selling bales that do not meet mass requirements. Thus, the baler controller 420 can maintain the size of the fully formed bales that are released by the baler 10 by lowering the density of the forming bale, when necessary. Further, the baler controller 420 can be configured to maximize the baling pressure that is exerted on the forming bale based on the maximum available power in order to produce fully formed bales with a maximum density before release.

Figure 5:
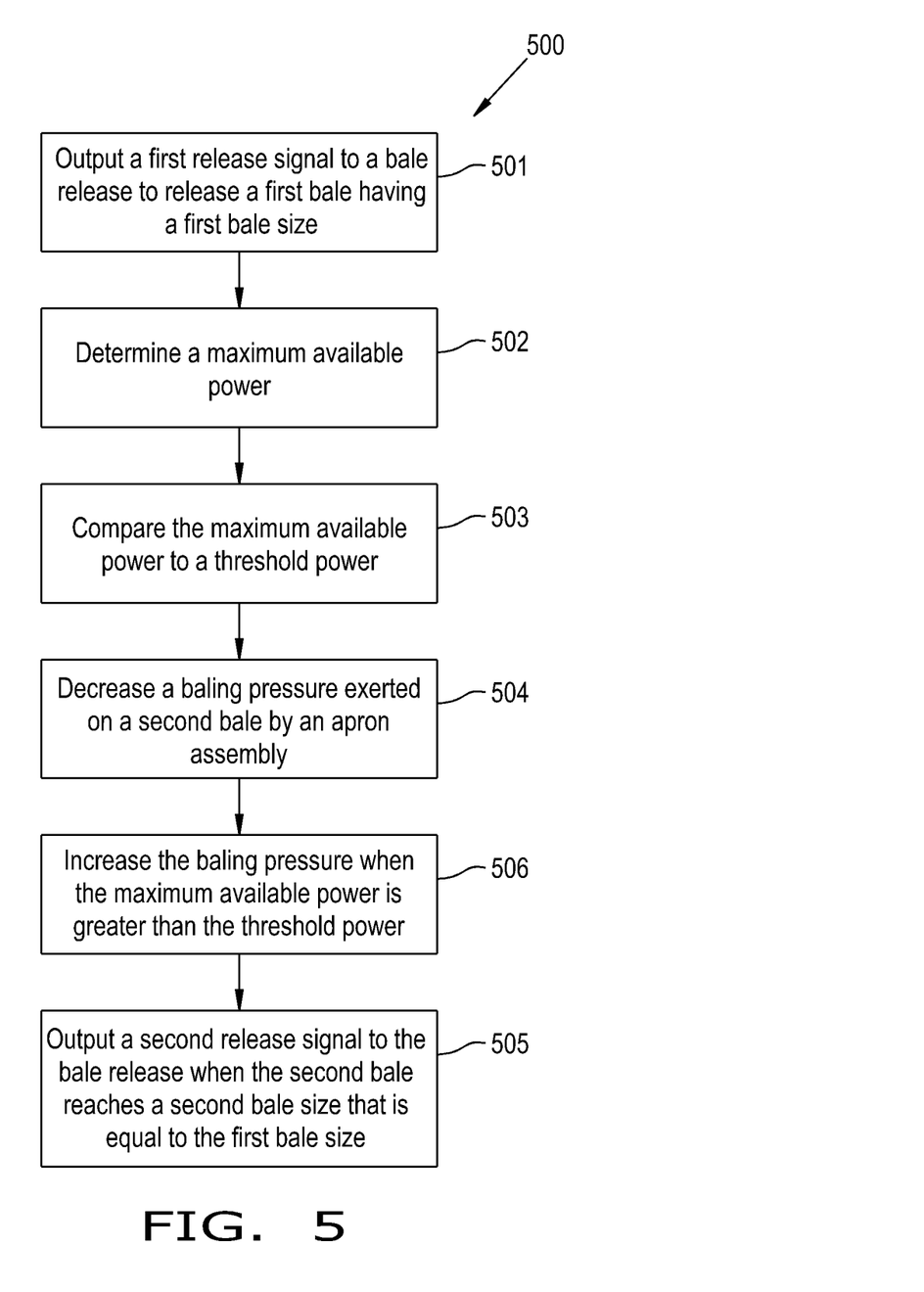
FIG. 5 is a flow chart illustrating an exemplary embodiment of a method of controlling formation of a bale, provided in accordance with the present disclosure.

Referring now to FIG. 5, an exemplary embodiment of a method 500 of controlling formation of a second bale in a bale forming chamber 20 to produce a fully formed second bale is illustrated. The method 500 is performed by a controller, such as the baler controller 420, and includes outputting 501 a first release signal to a bale release 19 to release a first bale, such as the previously described fully formed bale 430, defining a first bale size from the bale forming chamber 20. The method 500 further includes determining 502 a maximum available power that is available to form the second bale and comparing 503 the maximum available power to a threshold power. When the maximum available power is at a predetermined power value, relative to the threshold power, a baling pressure exerted on the second bale by an apron assembly 40 is decreased 504. A second release signal is output 505 to the bale release 19 to release the fully formed second bale from the bale forming chamber 20 when the fully formed second bale defines a second bale size that is substantially equal to the first bale size. As used herein, the term "substantially equal" refers to the first bale size and the second bale size differing from one another by no more than 3% to 5%. In some embodiments, the first bale size and the second bale size are a diameter and/or a mass of the first bale and the fully formed second bale, respectively.

When the maximum available power is greater than the threshold power, the baling pressure exerted on the second bale by the apron assembly 40 may be increased 506 to increase the density of the fully formed second bale. The threshold power may be, for example, a currently needed power of the apron assembly 40 to maintain a density of the second bale forming in the bale forming chamber 20, as previously described. In some embodiments, determining 502 the maximum available power includes determining a PTO power consumption from a received PTO power consumption signal and subtracting the PTO power consumption from a maximum tractor power value, which may be stored in the memory 421.

Figure 6:
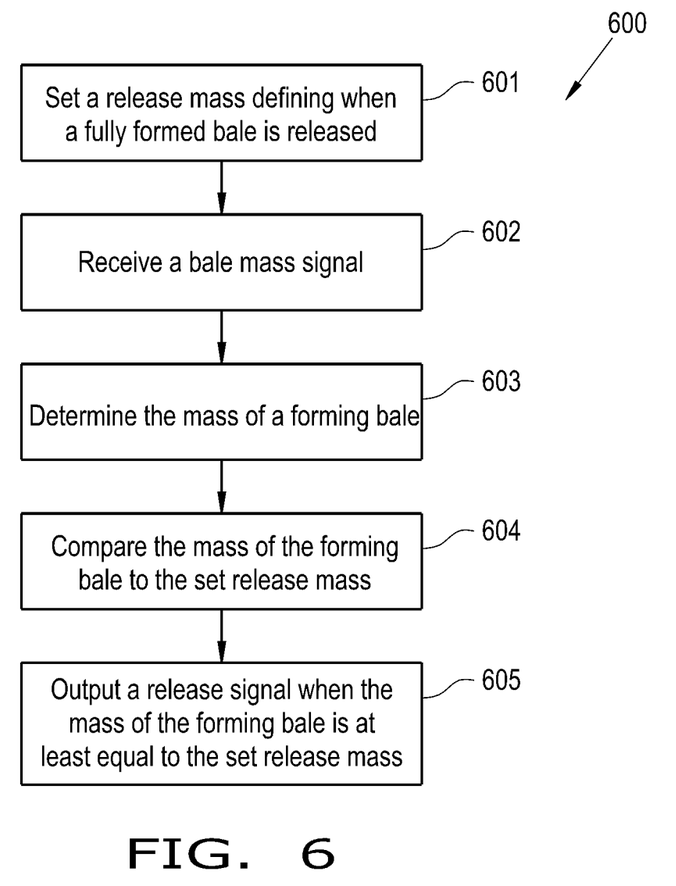
FIG. 6 is a flow chart illustrating an exemplary embodiment of a method of forming a bale, provided in accordance with the present disclosure.

Referring now to FIG. 6, an exemplary embodiment of a method 600 for forming a bale provided according to the present disclosure is illustrated. The method 600 may be performed by a controller, such as the previously described baler controller 420, and includes setting 601 a release mass of a fully formed bale defining when the fully formed bale is released, receiving 602 a bale mass signal from a bale mass sensor 74, determining 603 the mass of a bale forming in a bale forming chamber 20 based on the received bale mass signal, comparing 604 the mass of the bale forming in the bale forming chamber 20 to the set release mass, and outputting 605 a release signal to a bale release 19 when the mass of the bale forming in the bale forming chamber 20 is at least equal to the set release mass so the bale release 19 releases the bale. In some embodiments, the baler controller 420 can set the release mass based off one or more signals received from an operator interface 415. An operator can thus set the size of bales released by the baler 10 based on mass, rather than diameter, to reduce the risk of producing bales that are below the advertised sale mass of the bales.

It is to be understood that the steps of the methods 500, 600 are performed by the controller 420 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 420 described herein, such as the methods 500, 600, is implemented in software code or instructions which are tangibly stored on a tangible computer readable medium, such as the memory 421 of the controller 420. The controller 420 loads the software code or instructions via a direct interface with the computer readable medium or via a wired and/or wireless network. Upon loading and executing such software code or instructions by the controller 420, the controller 420 may perform any of the functionality of the controller 420 described herein, including any steps of the methods 500, 600 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural baler, comprising:
    a chassis;
    a power take-off (PTO) coupler carried by the chassis and configured for connecting to a power source;
    a bale forming chamber carried by the chassis and comprising an apron assembly comprising at least one chain and a drive roll coupled to the at least one chain and the coupler;
    an apron tensioning system comprising an actuator and coupled to the at least one chain and configured to control a baling pressure exerted on a bale forming in the bale forming chamber;
    and
    a controller operatively coupled to the apron tensioning system, the controller being configured to:
        set a completed bale size of the fully formed bale defining when the fully formed bale is completed released;
        receive a PTO power consumption signal or an available power signal;
        determine a maximum available power based on the received signal;
        compare the maximum available power to a threshold power; and
        output a control signal to the apron tensioning system to decrease the baling pressure without changing the completed bale size when the maximum available power is at a predetermined power value, relative to the threshold power, wherein the predetermined power value is less than the threshold power.

2. The agricultural baler of claim 1, wherein the completed bale size is at least one of a diameter or a mass of the fully formed bale.

3. An agricultural baler, comprising:
    a chassis;
    a power take-off (PTO) coupler carried by the chassis and configured for connecting to a power source;
    a bale forming chamber carried by the chassis and comprising an apron assembly comprising at least one chain and a drive roll coupled to the at least one chain and the coupler;
    an apron tensioning system comprising an actuator and coupled to the at least one chain and configured to control a baling pressure exerted on a bale forming in the bale forming chamber; and
    a controller operatively coupled to the apron tensioning system, the controller being configured to:
        set a completed bale size of the fully formed bale defining when the fully formed bale is completed;
        receive a PTO power consumption signal or an available power signal;
        determine a maximum available power based on the received signal;
        compare the maximum available power to a threshold power; and
        output a control signal to the apron tensioning system to decrease the baling pressure without changing the completed bale size when the maximum available power is at a predetermined power value, relative to the threshold power;
    wherein the controller is configured to output another control signal to the apron tensioning system to increase the baling pressure when the maximum available power is greater than the threshold power.

4. The agricultural baler of claim 1, wherein the threshold power is a currently needed power of the apron assembly to maintain a density of the bale forming in the bale forming chamber.

5. An agricultural baler, comprising:
    a chassis;
    a power take-off (PTO) coupler carried by the chassis and configured for connecting to a power source;

a bale forming chamber carried by the chassis and comprising an apron assembly comprising at least one chain and a drive roll coupled to the at least one chain and the coupler;
an apron tensioning system comprising an actuator and coupled to the at least one chain and configured to control a baling pressure exerted on a bale forming in the bale forming chamber; and
a controller operatively coupled to the apron tensioning system, the controller being configured to:
set a completed bale size of the fully formed bale defining when the fully formed bale is completed;
receive a PTO power consumption signal or an available power signal;
determine a maximum available power based on the received signal;
compare the maximum available power to a threshold power; and
output a control signal to the apron tensioning system to decrease the baling pressure without changing the completed bale size when the maximum available power is at a predetermined power value, relative to the threshold power;
determine a PTO power consumption from the received PTO power consumption signal; and
subtract the PTO power consumption from a maximum tractor power value to determine the maximum available power.

6. The agricultural baler of claim 1, wherein the controller is configured to:
determine if the maximum available power is at least equal to a set power requirement for the apron assembly to exert a set baling pressure on the bale forming in the bale forming chamber; and
output a signal to the apron tensioning system so the set baling pressure is exerted on the bale forming in the bale forming chamber if the maximum available power is at least equal to the set power requirement.

7. An agricultural baling system, comprising:
a tractor comprising a frame, an engine carried by the frame, and a tractor controller; and
a baler coupled to the tractor, the baler comprising:
a chassis;
a power take-off (PTO) coupler carried by the chassis and coupled to the engine;
a bale forming chamber carried by the chassis and comprising an apron assembly comprising at least one chain and a drive roll coupled to the at least one chain and the coupler;
an apron tensioning system comprising an actuator and coupled to the at least one chain and configured to control a baling pressure exerted on a bale forming in the bale forming chamber;
a bale release actuator coupled to the bale forming chamber and configured upon activation to move a rear portion of the bale forming chamber to create an opening to release a fully formed bale from the bale forming chamber; and
a controller operatively coupled to the apron tensioning system, the bale release actuator, and the tractor controller, the controller being configured to:
set a release size of the fully formed bale defining when the fully formed bale is released;
receive a PTO power take off (PTO) power consumption signal or an available power signal from the tractor controller;
determine a maximum available power based on the received signal;
compare the maximum available power to a threshold power; and
output a control signal to the apron tensioning system to decrease the baling pressure without changing the release size when the maximum available power is at a predetermined power value, relative to the threshold power, wherein the predetermined power value is less than the threshold power.

8. The agricultural baling system of claim 7, wherein the release size is at least one of a diameter or a mass of the fully formed bale.

9. The agricultural baling system of claim 7, wherein the controller is configured to output another control signal to the apron tensioning system to increase the baling pressure when the maximum available power is greater than the threshold power.

10. The agricultural baling system of claim 7, wherein the threshold power is a currently needed power of the apron assembly to maintain a density of the bale forming in the bale forming chamber.

11. The agricultural baling system of claim 7, wherein the controller is configured to:
receive the PTO power consumption signal;
determine a PTO power consumption from the received PTO power consumption signal; and
subtract the PTO power consumption from a maximum tractor power value to determine the maximum available power.

12. The agricultural baling system of claim 7, wherein the controller is configured to:
determine if the maximum available power is at least equal to a set power requirement for the apron assembly to exert a set baling pressure on the bale forming in the bale forming chamber; and
output a signal to the apron tensioning system so the set baling pressure is exerted on the bale forming in the bale forming chamber if the maximum available power is at least equal to the set power requirement.

13. A method of controlling formation of a second bale in a bale forming chamber to produce a fully formed second bale, the method being performed by a controller and comprising:
outputting a first release signal to a bale release to release a first bale defining a first bale size from the bale forming chamber;
determining a maximum available power that is available to form the second bale;
comparing the maximum available power to a threshold power;
decreasing a baling pressure exerted on the second bale by an apron assembly when the maximum available power is at a predetermined power value, relative to the threshold power; and
outputting a second release signal to the bale release to release the fully formed second bale from the bale forming chamber, wherein the fully formed second bale defines a second bale size that is substantially equal to the first bale size, wherein the predetermined power value is less than the threshold power.

14. The method of claim 13, wherein the first bale size and the second bale size are at least one of a diameter or a mass of the respective bale.

15. The method of claim 13, further comprising increasing the baling pressure exerted on the second bale by the apron assembly when the maximum available power is greater than the threshold power.

16. The method of claim 13, wherein the threshold power is a currently needed power of the apron assembly to maintain a density of the second bale forming in the bale forming chamber.

17. The method of claim 13, wherein determining the maximum available power comprises determining a power take-off (PTO) power consumption from a received PTO power consumption signal and subtracting the PTO power consumption from a maximum tractor power value.

\* \* \* \* \*